(12) United States Patent
Xue et al.

(10) Patent No.: US 12,552,949 B2
(45) Date of Patent: Feb. 17, 2026

(54) HIGH ADHESION CONTINUOUS INK JET INKS

(71) Applicant: Videojet Technologies Inc., Wood Dale, IL (US)

(72) Inventors: Zheng Xue, Burr Ridge, IL (US);
Stormi Tindall, Joliet, IL (US);
Michael Kozee, Wheaton, IL (US);
Linfang Zhu, Woodridge, IL (US)

(73) Assignee: Videojet Technologies Inc., Wood Dale, IL (US)

( * ) Notice: Subject to any disclaimer, the term of this patent is extended or adjusted under 35 U.S.C. 154(b) by 198 days.

(21) Appl. No.: 18/266,409

(22) PCT Filed: Dec. 9, 2021

(86) PCT No.: PCT/US2021/062594
§ 371 (c)(1),
(2) Date: Jun. 9, 2023

(87) PCT Pub. No.: WO2022/125767
PCT Pub. Date: Jun. 16, 2022

(65) Prior Publication Data
US 2024/0043707 A1    Feb. 8, 2024

Related U.S. Application Data

(60) Provisional application No. 63/124,428, filed on Dec. 11, 2020.

(51) Int. Cl.
*C09D 11/30* (2014.01)
*C09D 11/08* (2006.01)
(Continued)

(52) U.S. Cl.
CPC ........... *C09D 11/102* (2013.01); *C09D 11/08* (2013.01); *C09D 11/106* (2013.01); *C09D 11/30* (2013.01)

(58) Field of Classification Search
CPC ..... C09D 11/102; C09D 11/08; C09D 11/106; C09D 11/30
See application file for complete search history.

(56) References Cited

U.S. PATENT DOCUMENTS 3,513,121 A * 5/1970 Heaton ................ C09D 157/08
525/207
7,309,388 B2    12/2007 Zhu et al.
(Continued)

FOREIGN PATENT DOCUMENTS

EP    3 053 971 A1    8/2016
JP    2013177526 A *  9/2013 ............. C09D 11/00
(Continued)

OTHER PUBLICATIONS

PCT International Search Report and Written Opinion for International Application No. PCT/US2021/62594 mailing date Feb. 23, 2022, 12 pages.
(Continued)

*Primary Examiner* — Yaovi M Ameh
(74) *Attorney, Agent, or Firm* — Foley & Lardner LLP

(57) ABSTRACT

The invention relates to a high adhesion ink with good abrasion resistance, useful for inkjet printing. These inks include a first resin comprising a polymer comprising vinyl chloride or a polymer comprising vinyl acetate, the first resin having a weight average molecular weight between about 20 kDa and about 80 kDa, a second resin comprising a tackifier resin with a weight average molecular weight between about 200 Da and about 2.5 kDa, and a third resin with a weight average molecular weight between about 500 Da and about 40 kDa.

18 Claims, 3 Drawing Sheets

Inventive Ink 18          Comparative Ink 1

HDPE flat
(untreated)

HDPE bottle
(untreated)

HDPE bottle (Flame treated)

(51) Int. Cl.
*C09D 11/102* (2014.01)
*C09D 11/106* (2014.01)

(56) References Cited

U.S. PATENT DOCUMENTS

| | | |
|---|---|---|
| 7,465,759 B1 | 12/2008 | Salisbury et al. |
| 7,789,955 B1 | 9/2010 | Gamblin et al. |
| 8,770,733 B2 | 7/2014 | Ohya et al. |
| 9,850,392 B2 | 12/2017 | De Saint-Romain |
| 11,208,569 B2 | 12/2021 | Weng et al. |
| 2004/0154495 A1* | 8/2004 | Zhu ............... C09D 11/36 106/31.86 |
| 2009/0244116 A1 | 10/2009 | Ohnishi |
| 2014/0113990 A1* | 4/2014 | Spiegel ............ C08F 255/00 524/588 |
| 2017/0349774 A1 | 12/2017 | Shimono et al. |
| 2018/0201798 A1* | 7/2018 | Loccufier ............ C09D 11/32 |
| 2020/0079967 A1 | 3/2020 | Xiao et al. |

FOREIGN PATENT DOCUMENTS

| | | | |
|---|---|---|---|
| JP | 2013184998 A * | 9/2013 | ............ C09D 11/00 |
| WO | WO-2018/191468 A1 | 10/2018 | |
| WO | WO-2019/185825 | 10/2019 | |

OTHER PUBLICATIONS

EP Search Report, Appln. No. 21904395.7, dated Jan. 15, 2025.

\* cited by examiner

HIGH ADHESION CONTINUOUS INK JET INKS

CROSS-REFERENCE TO RELATED APPLICATIONS

The present application is the U.S. National Stage Application of International Application No. PCT/US2021/062594, filed Dec. 9, 2021, which claims priority to U.S. Provisional Application No. 63/124,428, filed Dec. 11, 2020, both of which are incorporated herein by reference in their entireties and for all purposes.

BACKGROUND OF THE INVENTION

Field of the Invention

The invention relates to a high adhesion ink with good abrasion resistance, useful for inkjet printing.

Background of the Invention

Industrial and consumer goods are often packaged in plastic containers and coded or marked using non-contact ink jet printing, particularly CIJ (Continuous ink jet). The marks and printed codes must be robust enough to be able to survive distribution from the point of production to the point of sale and finally to the end user. Certain packaging materials are difficult to mark with consistently good quality using inkjet inks. Often abrasion of the product can occur inadvertently, for example by rubbing against another product or against a cardboard shipping container. Manufactures using ink jet inks to mark their products expect the printed codes on the products to survive abrasion during shipping and handling so the printed codes, such as expiration dates or best use dates, are legible to consumers. They can also expect the ink to pass simple adhesion tests, such as a tape transfer test, as a quality control check near the time of manufacture or later during the product's distribution. Some materials are particularly difficult for ink to adhere to. HDPE is used as a common container material for high value products like personal care items, automotive fluids, pesticides and some food items. On materials including direct coding onto untreated HDPE, there are no obvious solutions in the art to create long-lasting inkjet marks using currently available inks.

In order to overcome premature code failure due to abrasion, some products are marked in recessed locations, such as on the base of the container or at the point where containers taper down from a maximum width, such as on the neck of a bottle. However, the printhead must be configured in the production line to maintain a sufficient distance from the product to avoid collisions, which leads to an increased distance between the printhead and the recessed points compared to other points on the product's surface. As a result, the print quality can be degraded due to increased throw distance from the printhead to the recessed printing point. Other potential solutions are to print the mark or code onto secondary labels within small 'knockout' regions on the label which can be a burdensome offline process and can occupy otherwise valuable marketing space on the product's label. Therefore, there is a need in the art for inks with better adhesion and anti-abrasion qualities for these inkjet applications.

SUMMARY OF THE INVENTION

The invention provides ink products for inkjet printing where resistance to abrasion is desirable, particularly abrasion by common secondary packaging materials such as Kraft cardboard. These inventive inks are more abrasion resistant than current inks used in similar applications, including vinyl inks. The printed codes and marks also are resistant to tape transfer, a popular test that customers use to confirm adhesion of the ink to the substrate. This test does not necessarily correlate with abrasion resistance, but is simple to use. The inventive inks also produce printed codes with better scratch resistance than non-vinyl inks, tested using hard, abrasive materials (i.e., a human fingernail), and better scratch resistance on HDPE than existing inks, such as vinyl inks.

The inks produce printed codes that work on a range of plastics, including difficult-to-adhere to plastics including HDPE, PP, LDPE and the like. In particular, the printed codes made using the inventive inks achieve good overall adhesion on untreated HDPE. The printed codes maintain better abrasion stability over time when stored at temperatures up to average storage temperatures in warehouses (i.e., 40° C.).

The dried inks according to this invention have good resolubility at the CIJ nozzle orifice and hence show little or no tendency for the directed ink stream to deviate from the ink stream catcher at a start-up after a period of printer shutdown, particularly in hot environments. The ink disclosed herein has wide operable viscosity range where it exhibits a wide phasing and modulation voltage window. The inks also exhibit low misting and thus run more reliably over time when subject to normal pressure variations within the printer.

A first aspect of the present invention relates to an inkjet ink composition comprising: (a) a first resin comprising a polymer comprising vinyl chloride or a polymer comprising vinyl acetate, the first resin having a weight average molecular weight between about 20 kDa and about 80 kDa; (b) a second resin comprising a tackifier resin with a weight average molecular weight between about 200 Da and about 2.5 kDa; (c) a third resin with a weight average molecular weight between about 500 Da and about 40 kDa; (d) a solvent; and (e) a colorant.

The first resin can comprise a polymer comprising vinyl acetate, preferably a vinyl acetate copolymer. The vinyl acetate resin can be a homopolymer or a copolymer comprising at least one other vinyl monomer, such as vinyl laurate, or a copolymer comprising at least one functional monomer, such as crotonic acid. The vinyl acetate content of the resin can be greater than 90% by weight. In general, the vinyl acetate resin is highly soluble in the solvents used in the inkjet ink of the present invention and a broad range of effective molecular weights can be useful.

The first resin can comprise a polymer comprising vinyl chloride, preferably a vinyl chloride copolymer, such as a copolymer of vinyl chloride and at least one functionalized secondary monomer which served to improve the solubility of the vinyl chloride polymer in the main solvents such as hydroxy acrylate , vinyl alcohol, hydroxyalkyl acrylate or terpolymer of vinyl chloride, vinyl acetate, and a carboxyl containing monomers such as maleic acid, acrylic acid, methyl acrylic acid, crotonic acid, dicarboxylic acid ester, and pertaining to each embodiments of the above any other unsaturated carboxy or hydroxy functionalized containing monomers that are reactive to radical polymerization.

The first resin can be a copolymer of vinyl chloride and vinyl acetate, optionally where the vinyl acetate content of the copolymer is 40% of the copolymer by weight or less, or preferably from about 10 to 35%, or more preferably from about 14 to 35%. Alternatively, the first resin can be a copolymer of vinyl acetate and crotonic acid, optionally wherein the vinyl acetate content of the copolymer is 75% of the copolymer by weight or more. The first resin can be a terpolymer of vinyl chloride, vinyl acetate, and a carboxyl containing monomer, optionally the carboxyl containing monomer is selected from crotonic acid, maleic acid, acrylic acid, methyl acrylic acid, dicarboxylic acid ester, and mixtures of any thereof.

The inkjet ink composition can contain from about 4% to about 10% by weight of the first resin. The inkjet ink composition can contain from about 5% to about 8% by weight of the first resin. The inkjet ink composition can contain from about 1% to about 10% by weight of the second resin. The inkjet ink composition can contain from about 4% to about 8% by weight of the second resin. The inkjet ink composition can contain the first resin and the second resin in a mass ratio from about 0.4:1 to about 10:1, preferably a ratio of about 0.5:1 to about 2.5:1, more preferably a ratio of about 0.7:1 to about 1:1.

The second resin can be selected from a rosin ester, a terpene phenolic resin, a terpene or modified terpene resin, an aliphatic resin, a cycloaliphatic hydrocarbon resin, an aromatic hydrocarbon resins, a hydrogenated hydrocarbon resin, a low molecular weight phenolic resin, and a mixture of any thereof, preferably the second resin is a hydrogenated rosin ester.

The inkjet ink composition can contain from about 0.1 to about 10% by weight of the third resin. The inkjet ink composition can contain from about 1% to about 8% by weight of the third resin. The inkjet ink composition can contain from about 2% to about 5% by weight of the third resin.

The third resin can have a resolubility rate of greater than about 40% in an hour in methyl ethyl ketone at 30° C., preferably greater than about 50%, more preferably greater than about 60%. It will be understood that the value of the resolubility rate cannot exceed 100% and, if upper limits are to be included for resolubility rates, they should be taken to be 100%.

The third resin can be selected from an acrylic resin, a styrenated acrylic resin, a carboxylic acid modified acrylic resin, a styrene allyl alcohol resin, a vinyl acetate resin, a sulfonamide modified epoxy resin, a ketone-aldehyde resin, a polyester resin, and a mixture of any thereof.

The inkjet ink composition can further contain a triazole compound (which is commonly employed as a corrosion inhibitor), preferably at between about 0.01 and 1.0% of the ink composition by weight.

The inkjet ink composition can further contain a silicone polyether surfactant. The concentration of the silicone polyether surfactant can be in an amount between about 0.05 and about 4.0% of the ink composition by weight, preferably in an amount between about 1.5 and about 2.5% of the ink composition by weight.

Printed marks made from the inkjet ink composition on high density polyethylene or polypropylene can remain legible after rubbing with Kraft paper for at least 10 cycles. Printed marks made from the inkjet ink composition on high density polyethylene or polypropylene can remain legible after rubbing with Kraft paper for at least 5 cycles after storage at 40° C. for 4 weeks. Printed marks made from the inkjet ink composition on a plastic surface can resist tape transfer after printing, optionally the resulting printed marks can retain the same tape transfer rating after aging for 1 week at 40° C.

Specifically, the invention relates to an inkjet ink composition comprising: (a) a first resin comprising a vinyl chloride copolymer resin with a weight average molecular weight less than about 60 kDa; (b) a second resin comprising a tackifier resin; (c) a third resin with a weight average molecular weight between about 1 kDa and about 20 kDa; (d) a solvent; and (e) a colorant. In some embodiments, the ink composition has a resolubility rate of at least about 40% in an hour in static contact with methyl ethyl ketone at 30° C. In some embodiments of the invention, the first resin is a copolymer of vinyl chloride and vinyl acetate, where the vinyl acetate content is 35% of the copolymer or lower, or terpolymer of vinyl chloride, vinyl acetate, and a carboxyl containing monomer such as maleic acid, acrylic acid, methyl acrylic acid, and any other unsaturated carboxy containing monomers that are reactive to radical polymerization.

Preferred ink compositions contain about 4% to about 10% of the first resin by weight and about 1% to about 10% of the second resin by weight. In other embodiments, the ink compositions contain the first resin and the second resin in a ratio of about 2.5:1 by weight.

Preferably, the first resin is a copolymer of vinyl chloride and vinyl acetate.

In some embodiments, the second resin is selected from a rosin ester, a terpene phenolic resin, a terpene or modified terpene resin, an aliphatic resin, a cycloaliphatic hydrocarbon resin, an aromatic hydrocarbon resins, a hydrogenated hydrocarbon resin, a low molecular weight phenolic resin, and a mixture of any thereof.

Preferred inkjet ink compositions contain up to about 10% of the third resin, which preferably is a liquid or has a resolubility rate of greater than about 40% in an hour in methyl ethyl ketone at 30° C. The third resin can be selected from an acrylic resin, a styrenated acrylic resin, a styrene allyl alcohol resin, a vinyl acetate resin, a sulfonamide modified epoxy resin, a ketone-aldehyde resin, a polyester resin, and a mixture of any thereof.

Preferred embodiments of the inkjet inks further contain a triazole corrosion inhibitor and/or a silicone polyether surfactant. When present, the active concentration of surfactant is up to about 2.5%.

In some embodiments of the invention, the printed marks made from the inventive inkjet ink compositions on high density polyethylene or polypropylene remain legible after rubbing with Kraft paper for at least 10 times; or remain legible after rubbing with Kraft paper for at least 5 times after storage at 40° C. for 4 weeks. Preferably, printed marks made from the inkjet composition on a plastic surface resist tape transfer.

DETAILED DESCRIPTION

Definitions

Figure 1:
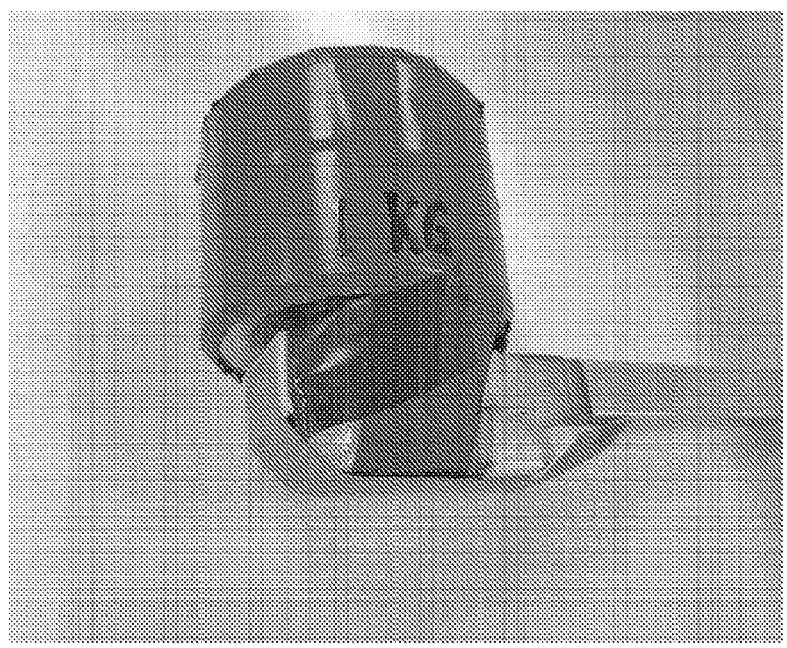
FIG. 1 is a photograph of an abrasion tool for testing. The arrow points to the Kraft paper contact surface.

Unless defined otherwise, all technical and scientific terms used herein have the same meaning as commonly understood by one of ordinary skill in the art. Although various methods and materials similar or equivalent to those described herein can be used in the practice or testing of the present invention, suitable methods and materials are described below. However, the skilled artisan understands that the methods and materials used and described are examples and may not be the only ones suitable for use in the invention. Moreover, as measurements are subject to inherent variability, any temperature, weight, volume, time interval, pH, salinity, molarity or molality, range, concentration and any other measurements, quantities or numerical expressions given herein are intended to be approximate and not exact or critical figures unless expressly stated to the contrary.

The term "about," as used herein, means plus or minus 20 percent of the recited value, so that, for example, "about 0.125" means 0.125±0.025, and "about 1.0" means 1.0±0.2.

As used herein, the term "ink" refers to a fluid or viscous substance used for writing or printing. The inks useful in the invention here are those suitable for use in continuous inkjet printing.

As used herein, the term "inkjet" and "ink jet" refer to inkjet printing, a type of printing that creates an image by propelling small droplets of ink onto a substrate such as paper, plastic, metal, glass, and the like. "Continuous inkjet" or "CIJ" methods are used, for example, in the marking and coding of products and packages. In this method, a pump directs a liquid ink composition from a reservoir to a nozzle to create a continuous stream of ink droplets, which are subjected to a controlled and variable electrostatic field, and thereby are charged as the droplets form according to the varying electrostatic field. The charged droplets are deflected to the proper location by passing through another electrostatic field to print the desired pattern on a substrate, or are recycled back to the reservoir for future use.

As used herein, the terms "mark" or "code" refer to a visible or invisible printed alphanumeric or pictorial mark made on a substrate such as a logo, barcode, or alphanumeric string of characters.

As used herein, the term "abrasion" refers to the process of scraping or wearing something away, or damage made by such scraping or wearing away.

As used herein, the term "solvent" refers to a component whose primary function is to dissolve and carry the other components of the ink composition. The term "solvent" also refers to a mixture of solvents.

As used herein, the term "resin," as used herein, generally refers to a substance that aids in making an ink composition adhere to the substrate to which it is applied during printing. In most cases, a resin is a polymeric material that holds other materials together to form a cohesive whole or to impart adhesive properties, particularly onto nonporous or semiporous substrates. A "tackifier resin" is a chemical composition used to increase the tack, or stickiness, of a composition. Such compounds usually have a low molecular weight, and have glass transition and softening temperatures above room temperature.

As used herein, the term "colorant," as used herein, refers to a dye, pigment or other substance that imparts color or modifies the hue of something else, and can refer to any such substance. Colorants include black dyes as well as other colors, and in some embodiments can be food grade, cosmetic grade or pharmacopeia grade colorants.

As used herein, the term "substrate" refers to a substance on which a mark is printed. Substrates can include, but are not limited to plastic, glass, metal and metal alloys, wood, paper, leather, and the like.

As used herein, the term "weight average molecular weight" ($M_w$) in the context of polymers relates to the weight fraction of molecules in a polymer sample. It is a way of determining the molecular mass of a polymer, giving the average of the molecular masses of the individual macromolecules in the polymer sample. Mw is calculated from the weight fraction distribution of different sized molecules vs. the number average molecular weight ($M_n$) which is calculated from the mole fraction distribution of different sized molecules in a sample.

As used herein, the term "resolubility" refers to the quality of being resolvable or redissolvable. A "resolubility rate" is the rate at which a substance is resolvable.

As used herein, the term "corrosion inhibitor" refers to a chemical compound that decreases the corrosion rate of a metal or alloy that comes in contact with a fluid, such as, for example, hydrazine compositions, antioxidants, benzotriazole compositions, and the like. Triazole corrosion inhibitors such as 1,2,4-triazole, benzotriazole, naphthotriazole, and the like are preferred components for the inventive inks. The most preferred corrosion inhibitor for use with the invention is benzotriazole.

As used herein, the term "surfactant" refers to a substance that reduces the surface tension of a liquid in which it is dissolved.

As used herein, the term "Kraft paper" refers to a strong, durable paperboard (cardboard) produced from chemical pulp, produced in the Kraft process.

As used herein, the term "polymer" refers to a substance that has a molecular structure with a large number of similar units (monomers) bonded together. A "copolymer" is a polymer made by reaction of at least two different monomers (i.e., with units of more than one kind). A "terpolymer" is a polymer made by reaction with at least three different monomers.

As used herein, the term "carboxyl containing monomer" refers to a monomer that contains a carboxyl moiety, for example, maleic acid, acrylic acid, and methyl acrylic acid.

Embodiments of the Invention

Preferred embodiments of the invention include ink compositions that contain a first resin, a second resin, and a third resin. Optionally, the ink compositions also comprise a corrosion inhibitor and/or a surfactant. The inks also contain a suitable solvent and a suitable colorant.

The first resin can be a polymer comprising vinyl chloride, which can include other monomers such as vinyl acetate.

The first resin can be a polymer comprising vinyl acetate, which can include other monomers.

In embodiments, the first resin is a vinyl acetate resin. In these embodiments, the vinyl acetate content of the resin can be higher than 90%. The polyvinyl acetate based polymers can be homopolymers or copolymers with other vinylic monomers such as vinyl laurate or copolymerized with functional monomers such as crotonic acid. In general the chosen polyvinyl acetate polymers are highly soluble in the solvents of the present invention and a broad range of effective molecular weights can be useful. The softness of the polyvinyl acetate polymer is of significance and the glass transition temperature (Tg) of the polymer can be within the range of 30 to 70° C. and more preferably within the range of about 40 to 60° C.

In other embodiments, the first resin is a vinyl acetate copolymer resin including vinyl acetate and a carboxyl including monomer, such as crotonic acid. The vinyl acetate content is about 75% by weight or higher, preferably about 75 to about 95% by weight, more preferably about 80 to 85% by weight.

In other embodiments, the first resin is a vinyl acetate copolymer resin including vinyl chloride and vinyl acetate where the vinyl acetate content is about 40% by weight or lower, preferably from about 10 to 35% by weight, or more preferably from about 14 to 35% by weight. Other preferred embodiments of the invention include ink compositions that contain a vinyl chloride polymer resin comprising vinyl chloride and at least one other functionalized monomer that improves the solubility of the vinyl chloride polymer in the main solvents. The functionalized monomers can be selected from hydroxy acrylate vinyl alcohol, hydroxyalkyl acrylate, vinyl acetate, and carboxyl containing monomers such as maleic acid, acrylic acid, methyl acrylic acid, dicarboxylic acid ester, and other unsaturated carboxy or hydroxy functionalized monomers that are reactive to radical polymerization. In the latter case, the polymer can be a copolymer or a terpolymer including one or more of the aforementioned functionalized monomers. A particular embodiment is a terpolymer comprising vinyl chloride, vinyl acetate and one of the aforementioned functionalized monomers that is not vinyl acetate. The polymer can be further characterized by exhibiting an acid value that is less than 20. In alternative embodiments the acid number can range between about 2 and 10.

Preferred inkjet ink compositions contain between about 2.5% and about 15% or, more preferably about 4 and 10% of the first resin. The first resin can have a weight average molecular weight of less than about 100 kDa, preferably from about 20 kDa to about 80 kDa, more preferably from about 30 kDa to about 60 kDa.

The second resin is a tackifier resin, preferably selected from a rosin ester resin, a terpene phenolic resin, a terpene or modified terpene resin, an aliphatic resin, a cycloaliphatic hydrocarbon resin, an aromatic hydrocarbon resin, a hydrogenated hydrocarbon resin, a low molecular weight phenolic resin, or a mixture of any of these resins. Preferred second (tackifier) resins are rosin esters, terpene, modified terpene, and terpene phenolic. The tackifier resin has a weight average molecular weight between about 200 Da and about 5 kDa, preferably between about 200 Da and about 2.5 kDa.

The second resin can comprise one or more tackifier resins is at a combined concentration between about 1% and about 10% by weight of the composition, preferably about 4% and about 8% by weight of the composition. The first and second resins can be combined in any ratio within these ranges.

In other embodiments, the first resin and the second resin are contained in the ink composition at a mass ratio from about 0.4:1 to 10:1, preferably from about 0.5:1 to about 2.5:1 first resin to second resin, more preferably in a ratio of about 0.7:1 to about 1:1.

The third resin preferably is selected from resins of the classes of acrylic resins, styrenated acrylic resins, carboxylic acid modified acrylic resins, styrene allyl alcohol resins, vinyl acetate resins, sulfonamide modified epoxy resins, ketone-aldehyde resins, polyester resins, or a mixture of any of these resins. A preferred resin is selected from styrenated acrylic resins, carboxylic acid modified acrylic resins, styrene allyl alcohol resins, or vinyl acetate resins and the most preferred resins are styrene allyl alcohol resins. The third resin is optionally present at a concentration up to about 15% by weight, preferably between about 0.1 and about 10% by weight in the ink composition, more preferably between about 1 and about 8% by weight in the ink composition, and most preferably between about 2 and about 5% by weight in the ink composition. The third resin can have a weight average molecular weight between about 1 kDa and about 20 kDa, for example about 5 kDa and about 15 kDa. Alternatively, the third resin can have a weight average molecular weight between about 1 kDa and about 40 kDa, for example between about 3 kDa and about 15 kDa. The third resin preferably has a resolubility rate of greater than about 40% in an hour in methyl ethyl ketone (MEK), based on the test method disclosed in Example 1.

The inventive ink compositions also optionally contain a corrosion inhibitor, preferably a triazole corrosion inhibitor, such as benzotriazole (BTA), preferably at between about 0.01 and 1.0% of the ink composition by weight.

The inventive ink compositions also optionally contain a surfactant, preferably a silicone polyether surfactant, such as Dow Corning™ 205SL, at an active concentration of up to about 5% and preferably up to about 2.5%. The concentration of the silicone polyether surfactant can be in an amount between about 0.001 and about 4.0% of the ink composition by weight, preferably in an amount between about 1.5 and about 2.5% of the ink composition by weight Alternatively, the concentration of the silicone polyether surfactant can be in an amount between about 0.001 and 2.0% of the ink composition by weight.

Embodiments of the invention also include a solvent or mixture of solvents. A preferred solvent is methyl ethyl ketone (MEK), but other solvents can be used, including but not limited to acetone, methyl n-propyl ketone (MPK), methyl isopropyl ketone, methyl n-butyl ketone, methyl isobutyl ketone, cyclohexanone, and any mixture thereof. Solvent(s) preferably make up about 60% to about 90% by weight of the ink composition or more preferably about 70% to about 80% by weight of the ink composition.

Embodiments of the invention also include a colorant. Suitable colorants including but not limited to a dye, a pigment, and any mixture thereof. Preferred colorants include any dye that can be dissolved in the ink composition. Examples of dyes suitable for use in the ink composition of the present invention include, but are not limited to the group consisting of C.I. Solvent Yellow 19, C.I. Solvent Yellow 21, C.I. Solvent Yellow 61, C.I. Solvent Yellow 80, C.I. Solvent Orange 1, C.I. Orange 37, C.I. Orange 40, C.I. Solvent Orange 54, C.I. Solvent Orange 63, C.I. Solvent Red 8, Solvent Red 49, C.I. Solvent Red 81, C.I. Solvent Red 82, C.I. Solvent Red 84, C.I. Solvent Red 100, Orient Pink 312, C.I. Basic Violet 3, C.I. Basic Violet 4, C.I. Solvent Violet 8, C.I. Solvent Violet 21, C.I. Solvent Blue 2, C.I. Solvent Blue 5, C.I. Solvent Blue 11, C.I. Solvent Blue 25, C.I. Solvent Blue 36, C.I. Solvent Blue 38, C.I. Solvent Blue 55; C.I. Solvent Blue 70, C.I. Solvent Green 3, C.I. Solvent Black 3, C.I. Solvent Black 5, C.I. Solvent Black 7,C.I. Solvent Black 22, C.I. Solvent Black 26, C.I. Solvent Black 27, C.I. Solvent Black 29 (VALIFAST BLACK 3808 or ORASOL BLACK RLI.TM.), C.I. Solvent Black 48 (MORFAST BLACK 101.TM.), C.I. Oil Blue 613, and any combination thereof, and preferably one or more dyes selected from the group consisting of C.I. Solvent Black 2(ORASOL BLACK RLI.TM.), C.I. Solvent Black 27, C.I. Solvent Black 48, C.I. Solvent Black 3 (Oil Black 860), C.I. Basic Violet 3, C.I. Solvent Blue 38, C.I. Solvent Blue 70, C.I. Oil Blue 613, C.I. Solvent Red 49 (ORIENT PINK.TM. 312), C.I. Solvent Orange 54 (VALIFAST ORANGE.TM. 3210), and any combination thereof. The colorant generally is used in a range of about 1% to about 15% of the total weight of the ink composition, preferably in a range of about 1% to about 10%.

Preferably, the ink compositions according to the invention have a viscosity of about 1.6 to about 10 centipoises at 25° C. (more preferably about 2 to about 6 centipoises at 25°

C.), an electrical resistivity of about 50 to about 2000 ohm-cm (more preferably about 50 to about 1800 ohm-cm), and a sonic velocity of about 1100 to about 1700 meters/second (more preferably about 1200 to about 1500 meters/second).

In certain embodiments of the invention, the printed codes remain legible after rubbing with Kraft paper for at least 10 cycles when printed on high density polyethylene (HDPE) or polypropylene, or after rubbing with Kraft paper for at least 5 times after the printed substrate is stored at 40° C. for 4 weeks. In certain embodiments, the printed codes also will resist tape transfer when printed on plastic surfaces.

EXAMPLES

This invention is not limited to the particular processes, compositions, or methodologies described, as these can vary. The terminology used in the description is for the purpose of describing the particular versions or embodiments only, and is not intended to limit the scope of the present invention which will be limited only by the appended claims. Although any methods and materials similar or equivalent to those described herein can be used in the practice or testing of embodiments of the present invention, the preferred methods, devices, and materials are now described. All publications mentioned herein, are incorporated by reference in their entirety; nothing herein is to be construed as an admission that the invention is not entitled to antedate such disclosure by virtue of prior invention.

Example 1: Demonstration of Selection of Materials.

For reliable operation in inkjet, the first resins were initially selected based on their molecular weights and resolubility rates. In Table 1, below, is a comparison of the bulk resolubility rates of various materials. After dissolving 1.00 g of a resin in 10 g of MEK the solution was dried in a 20 mL glass scintillation vial with a diameter of 28 mm overnight at 50° C. to obtain a homogeneous solid of roughly controlled surface area. The dried resin was then resolubilized in 10 g of MEK and left standing in the same vial with no agitation at 30° C. for 1 hour. To obtain the grams lost (dissolved), the MEK supernatant was simply drained off, the undissolved solid in the vial was allowed to dry for 1 hour at room temperature and the residual solid weight was determined based on the initial vial tare weight. The residual was subtracted from 1.00 gram to calculate the mass of resin dissolved which was converted to a percentage dissolved. Cases where weight gain was measured were rounded down to 0%.

TABLE 1

Bulk Resolubility Rates

| Resin Material | Type | MW (kDa) | % dissolved | HDPE fingernail adhesion | PP fingernail adhesion |
|---|---|---|---|---|---|
| Solbin CLL | polyvinyl chloride/vinyl acetate | 40-50 | 16 | Poor | Poor |
| Vinnol E15/45M | polyvinyl chloride/vinyl acetate (carboxylic acid modified) | 50-60 | 8 | Poor | Poor |
| Vinnol H30/48 | polyvinyl chloride/vinyl acetate | 60-80 | 3 | Poor | Poor |
| Solbin M5 | polyvinyl chloride/vinyl acetate | 75-90 | 0 | Poor | Poor |
| Solbin M5R | polyvinyl chloride/vinyl acetate | 80 | 6 | Poor | Poor |
| Vinnol E15/40A | polyvinyl chloride/hydroxy acrylate | 55-60 | 0 | Poor | Poor |
| S LEC BL10 | polyvinyl butyral | 49 | 5 | Poor | Poor |
| Vinnapas C 305 | polyvinyl acetate/crotonic acid | 50 | 0 | Poor | Poor |
| Vinnapas B 30 | polyvinyl acetate homopolymer | 45-55 | 29 | Poor | Poor |
| Degalan 67/11 | Acrylic resin (carboxylic acid modified) | 37 | 0 | Poor | Poor |
| CAB 551-0.01 | cellulose ester | 31 | 26 | Poor | Poor |

In general, polyvinyl chloride acetate and polyvinyl acetate resins showed good bulk resolubilities that were comparable to a cellulose ester (CAB) that traditionally showed good resolubility. Solbin CLL (molecular weight below 50 kDa) was the best polyvinyl chloride/acetate resin in this respect. An adhesion screen was also performed by depositing a thin layer 20% resin solution on an untreated high-density polyethylene (HDPE) or polypropylene (PP) substrate. The deposited resin layer was then allowed to dry overnight and tested for fingernail scratch resistance (rated qualitatively as Excellent, Good, Moderate, or Poor). By themselves, these resins did not possess any inherently good adhesion to HDPE or PP materials. In a similar manner, other resinous materials were chosen as shown in Table 2 below.

TABLE 2

Resolubility Rate and Adhesion Results

| Resin | Type | MW (kDa) | % dissolved | HDPE fingernail adhesion | PP fingernail adhesion |
|---|---|---|---|---|---|
| Polyster T115 | terpene phenolic | 1.2 | 100 | Moderate | Moderate |
| Tego Variplus TC | ketone-aldehyde resin | 1.2 | 91 | Moderate | Good |
| Staybelite Ester 10 | hydrogenated rosin ester | 0.9 | 68 | Moderate | Good |
| Dynapol L 952 | polyester | 18.0 | 0 | Moderate | Poor |
| SAA-100 | styrene allyl alcohol | 3.1 | 59 | Moderate | Moderate |
| Kplast 1022 | polyurethane | 7.5 | 58 | Poor | Poor |
| Vinnapas B 1.5 | polyvinylacetate | 15.0 | 48 | Poor | Moderate |
| Joncryl 586 | acrylic (styrenated) | 4.3 | 65 | Poor | Moderate |
| Tego AddBond LTH | polyester | 5.4 | 29 | Moderate | Moderate |
| Ad-Pro MTS | sulfonamide modified epoxy | 1.6 | 72 | Moderate | Moderate |
| Elvacite 1010 | acrylic resin | 5.5 | 50 | Moderate | Moderate |

Unlike the main resins, the tackifiers and third resin choices demonstrated improved inherent adhesion to HDPE and PP materials. The most optimum resins for achieving a combination of good adhesion and good resolubility are the classes of rosin esters and ketone-aldehyde resins.

Inks combining preferred ingredients based on the tests reported above were formulated with a main (first) resin, a tackifier (second) resin, dye, and surfactant as shown in Table 3. In each case the dye contained 6.4% Valifast Black 3840. The surfactant was DC205 (from Dow Corning, Inc.) at the percentage shown and the balance was methyl ethyl ketone (MEK) solvent.

Figure 2:
FIG. 2 is a photograph of abrasion testing.

Each ink as made had a viscosity of between 3.0 and 5.0 cp at 25° C., however inks having a viscosity of about 2.0 to about 8.0 cp at 25° C. are suitable for these inks. Abrasion tests were performed by printing codes on untreated HDPE and PP substrate and drying at ambient conditions for at least 1 hour. The codes were then subjected to a fingernail scratch test by applying medium force to scrape 10 times, unidirectionally, across the entire code. The codes were also subjected to 10 Kraft abrasion cycles using an abrasion tool bearing a controlled weight of approximate 1 kilogram with a piece of Kraft paper mounted to it (see FIG. 1). The tool was held parallel to the code sample so that the Kraft paper affixed to it applied between about 1.0 and 1.5 kg equivalent of force while moving back-and-forth (1 cycle) across the entire code (see FIG. 2).

The legibility of the code was examined after the fingernail scratch or Kraft abrasion test. The rating scale shown in the table is an average rating of the two tests. The tape transfer test was performed by applying a piece of 3M Scotch Transparent Tape #600 (or equivalent) over the entire printed code using one firm (2-3 kg) rub. The tape was removed rapidly at a ca. 180° angle and then the percentage of code transferred to the tape was examined (rating scale shown in the table as an average tape rating on HDPE and PP).

TABLE 3

Abrasion and Tape Rating Results

| Ink | First Resin | First Resin (%) | Staybelite Ester 10 (%) | Valifast Black 3840 (%) | DC205 (%) | HDPE abrasion rating | PP abrasion rating | Overall Tape Rating |
|---|---|---|---|---|---|---|---|---|
| 1 | Solbin CLL | 8.0 | 8.0 | 6.4 | 1.2 | Good | Moderate | Poor |
| 2 | Vinnol E15/45M | 6.4 | 6.4 | 6.4 | 1.2 | Good | Good | Poor |
| 3 | Vinnol H30/48 | 6.4 | 6.4 | 6.4 | 1.2 | Good | Good | Moderate |
| 4 | S-Lec BL10 (PVB) | 6.4 | 6.4 | 6.4 | 1.2 | Moderate | Moderate | Poor |
| 5 | Vinnapas C 305 | 9.0 | 9.0 | 6.4 | 1.6 | Poor | Poor | Poor |
| 6 | Vinnol E15/45M | 5.4 | 10.8 | 6.4 | 1.4 | Moderate | Good | Good |

Abrasion test rating scale: Excellent = codes showed no change after 10 abrasion cycles; Good = codes showed some fading but were legible after 10 abrasion cycles; Moderate = codes were legible after 5 abrasion cycles but illegible after 10 abrasion cycles; Poor = codes were illegible after 5 abrasion cycles}. Tape transfer test rating scale: Excellent = codes showed no change; Good = codes were legible with less than 25% transfer; Moderate = codes showed greater than 50% transfer but were still legible; Poor = codes were illegible.

The adhesion results showed that the combination of a polyvinyl chloride/vinyl acetate resin with a rosin ester tackifier provided good to moderate abrasion resistance on the target substrate materials. In comparison, the tape transfer resistance was not satisfactory. Increasing the ratio of tackifier to polyvinyl chloride/vinyl acetate resin was able to significantly improve the tape rating. Optimal choice of polyvinyl chloride/vinyl acetate resin was then determined based on the resolubility results as well as the adhesion data. Due to comparatively poor resolubility and high molecular weight of Vinnol E15/45M and Vinnol H30/48 (as the first resin), these resins are less desirable for reliable printer performance. Solbin CLL provided better resolubility and was selected as the basis for further examples based on this property.

Example 2: Demonstration of Combination of Three Resins.

To achieve better abrasion and tape transfer resistance, functional inks were formulated with optimized weight percentages as shown in Table 4, below, and by inclusion of a third resin component. Each ink as made exhibited a viscosity of between 3.0 and 5.0 cp at 25° C.

TABLE 4

Test Results for Ink Compositions with Three Resins

| Ink | Third Resin (3%) | % Solbin CLL (First Resin) | % Staybelite Ester 10 (Second Resin) | % Valifast Black 3840 | % DC205 | HDPE abrasion rating | PP abrasion rating | Overall tape rating |
|---|---|---|---|---|---|---|---|---|
| 7 | Elvacite 1010 | 6.5 | 7.1 | 6.4 | 2.0 | Good | Excellent | Good |
| 8 | Joncryl 586 | 6.5 | 7.1 | 6.4 | 2.0 | Good | Good | Good |
| 9 | SAA-100 | 6.5 | 7.1 | 6.4 | 2.0 | Good | Good | Good |
| 10 | Vinnapas B 1.5 | 6.5 | 7.1 | 6.4 | 2.0 | Good | Excellent | Good |
| 11 | Add Pro MTS | 6.5 | 7.1 | 6.4 | 2.0 | Good | Good | Good |
| 12 | Variplus TC | 6.5 | 7.1 | 6.4 | 2.0 | Moderate | Good | Excellent |
| 13 | Add bond LTH | 6.5 | 7.1 | 6.4 | 2.0 | Moderate | Good | Good |
| 14 | Dynapol LS952 | 6.5 | 7.1 | 6.4 | 2.0 | Moderate | Good | Good |
| 15 | None | 6.5 | 7.1 | 6.4 | 2.0 | Moderate | Good | Good |
| 16 | None | 6.5 | 10.1 | 6.4 | 2.0 | Moderate | Good | Excellent |

A third resin comprising an acrylic, styrenated acrylic, styrene allyl alcohol, vinyl acetate, sulfonamide modified epoxy resin, or ketone-aldehyde resin, each produced inks with an abrasion adhesion rating of 'Moderate' or better combined with a tape adhesion rating of 'Good' or better. However, it was apparent that combinations including acrylics, styrenated acrylics, styrene allyl alcohols, polyvinyl acetate, or sulfonamide modified epoxy resins provided the best performance with at least 'Good' rating in every category. The examples in the table also generally show that improved tape transfer resistance is seen with a ketone-aldehyde resin or increasing the ratio of rosin ester in the formulation, although abrasion resistance was not improved in these cases.

Example 3: Optimized Inventive Ink Versus Comparative Examples.

Based on the molecular weight range and resolubility data of the third resin, as well as the adhesion results shown in Example 2, above, ink formulations were optimized to function well in inkjet printers with all necessary components included as shown in Table 5 below.

Comparative Ink 1 was an existing industrial inkjet ink comprising vinyl resin known to be generally good for printing onto plastics. Abrasion and tape transfer tests were used to compare the adhesion of the codes printed on untreated HDPE and PP substrates. Results are shown in Table 6.

TABLE 5

Exemplary Ink Formula Components

| Ink Formula Component | Inventive Ink 17 | Inventive Ink 18 | Inventive Ink 19 | Inventive Ink 20 |
| --- | --- | --- | --- | --- |
| MEK | 75.9 | 73.5 | 71.9 | 71.9 |
| Solbin CLL | 6.7 | 6.5 | — | — |
| Vinnapas C305 | — | — | 7.0 | 7.0 |
| Degalan LP 67/11 | — | — | 4.0 | 4.0 |
| Staybelite Ester 10 | 6.8 | 7.1 | 9.0 | 7.0 |
| Polyster T115 | — | — | — | 2.0 |
| Vinnapas B1.5 | 2.7 | — | — | — |
| SAA100 | — | 3.4 | — | — |
| Valifast Black 3878 | 5.4 | — | — | — |
| Valifast Black 3840 | — | 6.8 | 6.4 | 6.4 |
| DC205 | 1.5 | 2.5 | 1.7 | 1.7 |
| BYK-065 | 1.0 | — | — | — |
| PDMS-100 | — | 0.1 | — | — |
| BTA | — | 0.1 | — | — |
| Total | 100 | 100 | 100 | 100 |

TABLE 6

Abrasion and Tape Transfer Test Results

| | At RT, 24 hours | | | After 4 weeks at 40° C. | | |
| --- | --- | --- | --- | --- | --- | --- |
| Ink | HDPE abrasion rating | PP abrasion rating | Overall tape rating | HDPE abrasion rating | PP abrasion rating | Overall tape rating |
| Inventive Ink 17 | Good | Excellent | Good | Moderate | Good | Poor |
| Inventive Ink 18 | Good | Good | Excellent | Good | Good | Poor |
| Comparative Ink 1 | Poor | Moderate | Excellent | Poor | Poor | Moderate |

Inventive Inks 17 and 18 both demonstrated good to excellent performance in abrasion resistance including fingernail scratch and Kraft abrasion, as well as good initial tape transfer resistance. Comparative Ink 1 performed well in the tape transfer test but was unacceptable for abrasion resistance. Adhesion retention after aging was evaluated by printing codes on untreated HDPE and PP substrates and drying at ambient conditions for at least 1 hour. The substrates were then transferred to a 40° C. oven for accelerated aging. After being stored in the 40° C. oven for 4 weeks, the substrates were then removed from oven, cooled to ambient temperature, and then subjected to abrasion and tape transfer tests. Inventive Ink 18 was able to maintain a 'Good' rating for abrasion resistance on both HDPE and PP. However, tape transfer resistance of all inks was found to be reduced after the accelerated aging period.

TABLE 7

Improved Retention of Tape Transfer Resistance

| | At RT, 24 hours | | | After 1 week at 40° C. | | |
| --- | --- | --- | --- | --- | --- | --- |
| Ink | HDPE abrasion rating | PP abrasion rating | Overall tape rating | HDPE abrasion rating | PP abrasion rating | Overall tape rating |
| Comparative Ink 1 | Poor | Moderate | Excellent | Poor | Poor | Good |
| Inventive Ink 19 | Good | Good | Good | Moderate | Good | Good |
| Inventive Ink 20 | Good | Good | Good | Moderate | Good | Good |

Inventive Inks 19 and 20, which employed alternative main resins and co-resins selected from Table 1 and Table 2 above, demonstrated balanced adhesion performance. As shown in Table 7, both Inventive Inks 19 and 20 received a 'Good' rating on initial abrasion and tape transfer resistance. A 'Moderate' rating was still maintained after the coded substrates were stored in 40° C. for 1 week. Most importantly, the tape transfer resistance of Inventive Inks 19 and 20 were 'Good' after the accelerated aging period, whereas Comparative Ink 1 experienced some level of degradation after aging.

Example 4: Printer Performance.

Figure 3:
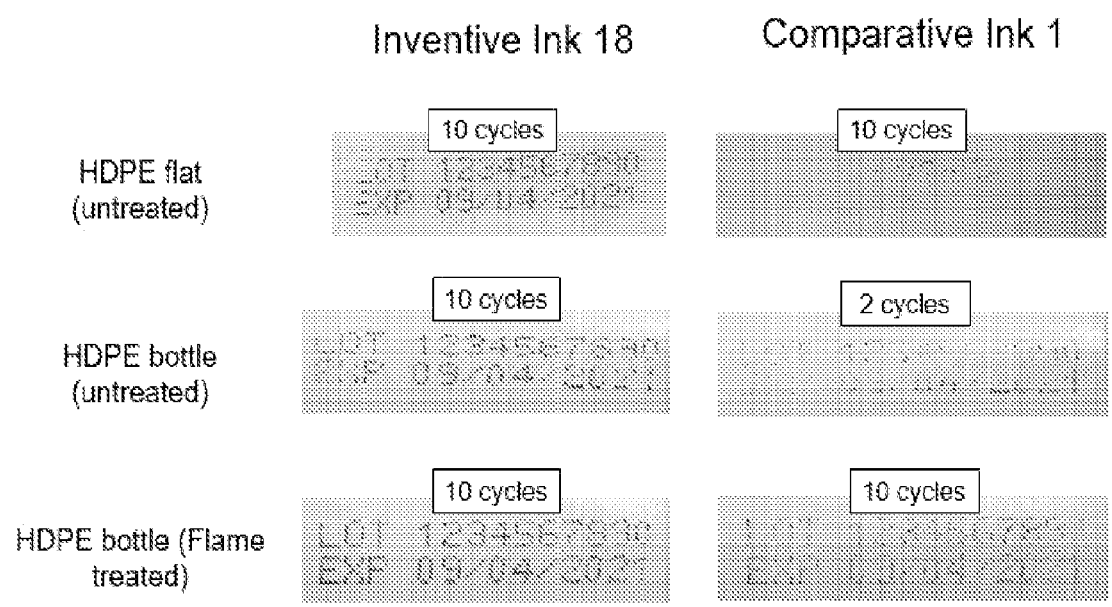
FIG. 3 is a set of photographs of printing results as indicated.

Inventive 18 from above was operated continuously in a Videojet 1000 series printer in a like-to-like test with Comparative Ink 1, operated simultaneously in another Videojet 1000 series printer. The printer were operated by printing continuously (performing periodic print sampling) and, at least once per every 24-hour period and on weekends, temporarily stopping the printing and shutting off the ink stream. A failure point (in 'Run Hours') was noted when either of the following was observed: 1) while continuously printing, the print quality degrade or, 2) after restarting the printer the ink stream failed to flow freely into the CIJ catcher, leading to a printer fault. As shown in Table 8, below, Comparative Ink 1 failed more often in this like-to-like comparison. See also FIG. 3, which shows photographs of the results after performing kraft abrasion tests for Comparative Ink 1 and Inventive Ink 18 printed onto HDPE surfaces. The inventive ink produced clearly superior results.

TABLE 8

Like-to-Like Test Comparison

| Ink | Printer run | Test Type | Run Hours | Failure observed? | MTBF, net |
|---|---|---|---|---|---|
| Comparative Ink 1 | 1 | Run to failure | 46 | yes | 149 |
|  | 2 | Run to failure | 252 | yes |  |
| Inventive Ink 18 | 1 | Run to failure | 139 | yes | >235 |
|  | 2 | Run to failure | 331 | no |  |

MTBF = mean time between failures (a measure of printer reliability, i.e., how long the printer can print without cleaning/maintenance).

REFERENCES

All references listed below and throughout the specification are hereby incorporated by reference in their entirety.
1. U.S. Pat. No. 9,850,392.
2. U.S. Pat. No. 7,309,388.
3. U.S. Pat. No. 7,465,759.
4. International Patent Publication No. WO 2019/185825

The invention claimed is:

1. An inkjet ink composition comprising:
   (a) a first resin comprising a polymer comprising vinyl chloride or a polymer comprising vinyl acetate, the first resin having a weight average molecular weight between about 20 kDa and about 80 kDa;
   (b) a second resin comprising a tackifier resin with a weight average molecular weight between about 200 Da and about 2.5 kDa, which is selected from a rosin ester, a terpene phenolic resin, a terpene or modified terpene resin, an aliphatic resin, a cycloaliphatic hydrocarbon resin, an aromatic hydrocarbon resin, a hydrogenated hydrocarbon resin, a low molecular weight phenolic resin, and a mixture of any of the foregoing;
   (c) a third resin with a weight average molecular weight between about 500 Da and about 40 kDa, which is selected from an acrylic resin, a styrenated acrylic resin, a carboxylic acid modified acrylic resin, a styrene allyl alcohol resin, a vinyl acetate resin, a sulfonamide modified epoxy resin, and a mixture of any of the foregoing;
   (d) a solvent; and
   (e) a colorant.

2. The inkjet ink composition of claim 1, wherein the first resin is a copolymer of vinyl chloride and vinyl acetate, where the vinyl acetate content of the copolymer optionally is 40% of the copolymer by weight or less.

3. The inkjet ink of claim 1, wherein the first resin is a copolymer of vinyl acetate and crotonic acid, where in the vinyl acetate content of the copolymer optionally is 75% of the copolymer by weight or more.

4. The inkjet ink composition of claim 1, wherein the first resin is a terpolymer of vinyl chloride, vinyl acetate, and a carboxyl containing monomer.

5. The inkjet ink composition of claim 4, wherein the carboxyl containing monomer is selected from crotonic acid, maleic acid, acrylic acid, methyl acrylic acid, dicarboxylic acid ester, and mixtures of any thereof.

6. The inkjet ink composition of claim 1, which contains from about 4% to about 10% by weight of the first resin.

7. The inkjet ink composition of claim 1, which contains from about 1% to about 10% by weight of the second resin.

8. The inkjet ink composition of claim 1, which contains the first resin and the second resin in a mass ratio from about 0.5:1 to about 2.5:1.

9. The inkjet ink composition of claim 1, wherein the second resin is a rosin ester, a terpene resin, or a modified terpene resin.

10. The inkjet ink composition of claim 1, which contains from about 0.1 to about 10% by weight of the third resin.

11. The inkjet ink composition of claim 1, wherein the third resin has a resolubility rate of greater than about 40% in an hour in methyl ethyl ketone at 30° C.

12. The inkjet ink composition of claim 1, which further contains a silicone polyether surfactant.

13. The inkjet ink composition of claim 12, wherein the concentration of the silicone polyether surfactant is in an amount between about 0.001 and about 4.0% of the ink composition by weight.

14. The inkjet ink composition of claim 13, wherein the silicone polyether surfactant is in an amount between about 1.5 and about 2.5% of the ink composition by weight.

15. The inkjet ink composition of claim 1, wherein printed marks made from the inkjet ink composition on high density polyethylene or polypropylene remain legible after rubbing with Kraft paper for at least 10 cycles.

16. The inkjet ink composition of claim 1, wherein printed marks made from the inkjet ink composition on high density polyethylene or polypropylene remain legible after rubbing with Kraft paper for at least 5 cycles after storage at 40° C. for 4 weeks.

17. The inkjet ink composition of claim 1, wherein printed marks made from the inkjet ink composition on a plastic surface resist tape transfer after printing.

18. The inkjet ink composition of claim 17, wherein the printed marks retain the same tape transfer rating after aging for 1 week at 40° C.

* * * * *